No. 888,178. PATENTED MAY 19, 1908.
C. A. KENNEY.
WATER GAGE.
APPLICATION FILED OCT. 12, 1907.
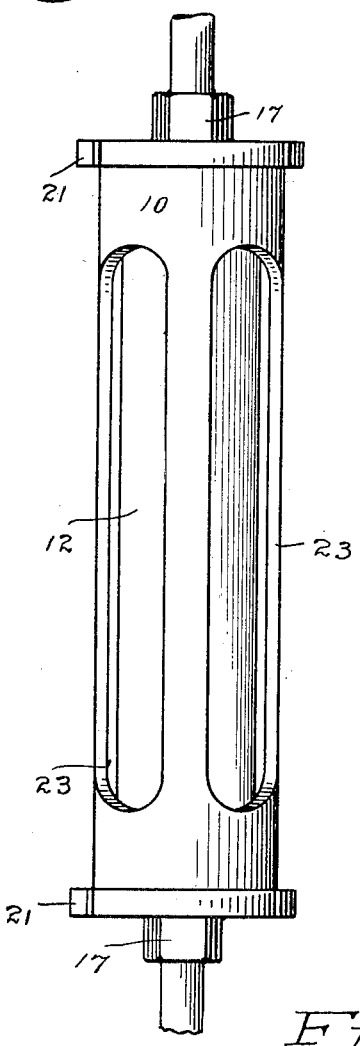
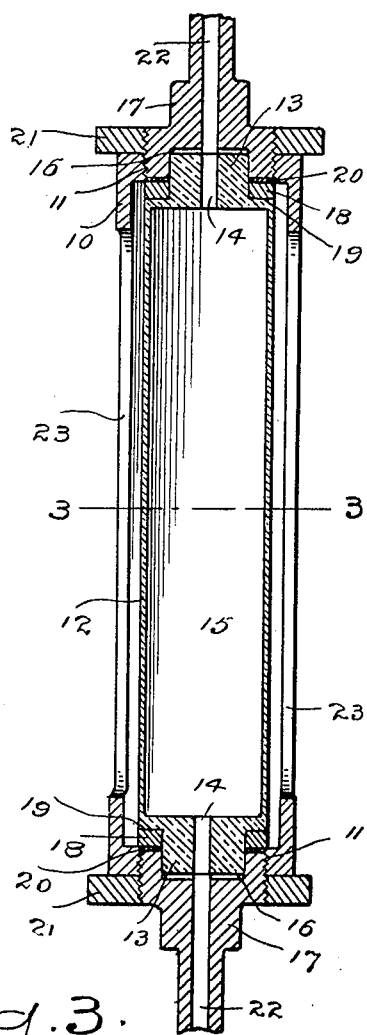
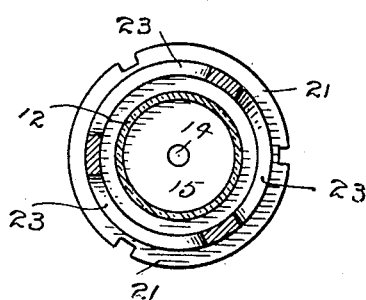
Witnesses:
H. A. Lamb.
S. W. Atherton.
Inventor
Charles A. Kenney
By Attorney
A. M. Wooster

UNITED STATES PATENT OFFICE.

CHARLES A. KENNEY, OF TRENTON, NEW JERSEY.

WATER-GAGE.

No. 888,178.

Specification of Letters Patent.

Patented May 19, 1908.

Application filed October 12, 1907. Serial No. 397,082.

*To all whom it may concern:*

Be it known that I, CHARLES A. KENNEY, a citizen of the United States, residing at Trenton, county of Mercer, State of New Jersey, have invented a new and useful Water-Gages, of which the following is a specification.

This invention relates to water and other liquid gages adapted for general use and especially adapted for use upon locomotive and other boilers, and the invention has for its object to provide a gage that shall be simple and inexpensive to produce, of few parts, strong and durable, easy to take apart to renew packings or the gage glass should it become broken, and so constructed that the glass may be seen from any direction.

With these and other objects in view I have devised the simple and novel gage, of which the following description in connection with the accompanying drawing is a specification, reference characters being used to indicate the several parts.

Figure 1 is an elevation of my novel gage complete; Fig. 2 a longitudinal section; and Fig. 3 is a transverse section on the line 3—3 in Fig. 2.

10 denotes the case or frame of my novel gage, which is provided at each end with an internal screw thread as at 11 and with a plurality of longitudinal openings 23 through which the gage glass 12 is visible. The gage glass is provided at each end with a boss 13 and each boss is provided with a longitudinal opening 14 communicating with the chamber 15 within the gage glass to provide free circulation of the water or other liquid. The boss at each end of the gage glass engages a socket 16 in a nipple 17 which is externally threaded to engage the thread 11 in the case.

18 denotes packing washers, preferably of rubber, which rest upon shoulders 19 at the ends of the gage glass and surround the bosses.

20 denotes copper or other metallic washers which may be interposed between the ends of the nipples and the packing washers.

21 denotes nuts, preferably spanner nuts, which engage the nipples at the ends of the gage and bear against the ends of the case, serving as jam nuts and keeping the parts locked together. Each nipple is provided with a longitudinal opening 22 in alinement with the opening in the corresponding boss.

The operations of assembling and taking apart will be readily understood from the drawing. In assembling, the packing washers, and the metallic washers if used, are placed over the bosses, the gage glass is placed within the body and the nipples are turned into engagement with the threads 11 at the ends of the case, the bosses at the ends of the gage glass being received in the sockets in the nipples. The parts are then locked in place by tightening up nuts 21 which engage the threads upon the nipples and bear against the ends of the case. Should the gage leak, the leak can usually be stopped by turning back one or both of the nuts 21 and turning the nipples inward slightly to compress the packing washers, the nuts being then tightened up again. Owing to the fact that the nipples 17 extend over and receive the bosses of the glass, the packing washers being located between the inner ends of the nipples and the shoulders which surround the bases of the bosses, no amount of tightening up can cause the washers to interfere with the passage of fluid through the openings in the bosses and nipples. Should new packing washers be required or the glass become broken, it is simply necessary to turn back the upper nut slightly and then turn the nipple out of engagement with the case. This will permit the glass and packing washers to be removed and a new glass or new packing washers to be placed in the gage in a moment's time. My present construction enables me to reduce the original cost of the gage both in material and labor to the minimum and to reduce the cost of making repairs to the minimum. The construction is such furthermore that no injury can happen to the gage through rusting of the parts, thereby greatly increasing its durability.

Having thus described my invention I claim:

1. A water gage comprising a gage glass having a boss at each end and shoulders surrounding said bosses, a case having openings through which the glass may be seen, said case being internally screw threaded at its ends, nipples engaging the threads in the case and having sockets into which the bosses extend and packing washers between the inner ends of the nipples and the shoulders of the glass.

2. A water gage comprising a gage glass having a boss at each end and shoulders surrounding said bosses, a case having openings for the purpose set forth and formed with screw threads at the ends, nipples engaging the threads and having sockets into which the bosses extend, packing washers between the
5 inner ends of the nipples and the shoulders of the glass, and nuts engaging the nipples and bearing against the ends of the case.

In testimony whereof I affix my signature, in presence of two witnesses.

CHARLES A. KENNEY.

Witnesses:
ELIZABETH C. KENNEY,
JAMES L. MYERS.